US012753634B2

(12) United States Patent

Akiyama et al.

(10) Patent No.: US 12,753,634 B2
(45) Date of Patent: Oct. 6, 2026

(54) CYLINDER LOCK AND DOOR

(71) Applicant: LIXIL Corporation, Tokyo (JP)

(72) Inventors: Fuminori Akiyama, Tokyo (JP); Takashi Mitsuhashi, Tokyo (JP)

(73) Assignee: LIXIL Corporation, Tokyo (JP)

( * ) Notice: Subject to any disclaimer, the term of this patent is extended or adjusted under 35 U.S.C. 154(b) by 16 days.

(21) Appl. No.: 18/714,776

(22) PCT Filed: Nov. 28, 2022

(86) PCT No.: PCT/JP2022/043708
§ 371 (c)(1),
(2) Date: May 30, 2024

(87) PCT Pub. No.: WO2023/100788
PCT Pub. Date: Jun. 8, 2023

(65) Prior Publication Data

US 2024/0384564 A1 Nov. 21, 2024

(30) Foreign Application Priority Data

Dec. 1, 2021 (JP) ................................ 2021-195254

(51) Int. Cl.
*E05B 27/00* (2006.01)

(52) U.S. Cl.
CPC ...... *E05B 27/0007* (2013.01); *E05B 27/0017* (2013.01)

(58) Field of Classification Search
CPC ............. E05B 27/0003; E05B 27/0007; E05B 27/0014; E05B 27/02
See application file for complete search history.

(56) References Cited

U.S. PATENT DOCUMENTS 3,176,488 A * 4/1965 Jacobi ................ E05B 27/0014 70/493
3,722,242 A * 3/1973 Lipschutz ........... E05B 27/0014 70/372
3,774,423 A * 11/1973 Orr ......................... E05B 27/00 70/408
4,148,201 A 4/1979 Miyamae et al.
4,531,390 A 7/1985 Best et al.
4,616,394 A * 10/1986 Best .................... E05B 27/0014 29/436

(Continued)

FOREIGN PATENT DOCUMENTS

JP H7-37009 Y2 8/1995
JP 2002021380 A * 1/2002
JP 2025099797 A * 7/2025 ............. E05B 15/00

*Primary Examiner* — Christopher J Boswell
(74) *Attorney, Agent, or Firm* — Morrison & Foerster LLP

(57) ABSTRACT

Provided is a cylinder lock which allows for a reduction in the diameter of an outer cylinder, and has good assembly workability. A cylinder lock comprising an outer cylinder, an inner cylinder that is rotatably fit with the outer cylinder, and a lid member that covers the outer cylinder, wherein the outer cylinder and the inner cylinder have a pin hole communicating with a keyhole and through which a driver pin and a tumbler pin can be inserted, and the lid member is a plurality of lid members that cover a plurality of rows of pin holes in the axial direction of the outer cylinder. It is preferable to provide two lid members configured by a spring steel material.

9 Claims, 6 Drawing Sheets

(56) References Cited

U.S. PATENT DOCUMENTS

| | | | | |
|---|---|---|---|---|
| 6,519,988 | B1 * | 2/2003 | Wu | E05B 15/06 70/358 |
| 6,810,703 | B1 * | 11/2004 | Huang | E05B 27/0014 70/DIG. 45 |
| 8,806,908 | B2 * | 8/2014 | Yu | E05B 35/12 70/214 |
| 9,181,727 | B2 * | 11/2015 | Litwinski | E05B 27/0089 |
| 2017/0226773 | A1 * | 8/2017 | McLeod | E05B 65/52 |

* cited by examiner

CYLINDER LOCK AND DOOR

CROSS-REFERENCE TO RELATED APPLICATIONS

This application is a national stage application under 35 USC 371 of International Application No. PCT/JP2022/043708, filed Nov. 28, 2022, which claims the priority of Japanese Application No. 2021-195254, filed Dec. 1, 2021. The entire contents of each priority application are incorporated herein by reference.

FIELD OF THE DISCLOSURE

The present disclosure relates to cylinder locks and doors.

BACKGROUND OF THE DISCLOSURE

Conventionally, cylinder locks installed in residential doors and similar applications are known. A cylinder lock includes an outer cylinder, an inner cylinder rotatably engaging with the outer cylinder, a driver pin that restricts the rotation of the inner cylinder, and a tumbler pin. The unlocking key corresponding to the cylinder lock includes protrusions and indentations formed on portions contacting the tumbler pin. When the unlocking key is inserted into the keyhole of the cylinder lock, and the contact surfaces of the driver pin and the tumbler pin are aligned with the shear line being the outer peripheral surface of the inner cylinder, the inner cylinder becomes rotatable. This enables the locking and unlocking of the cylinder lock. The driver pin and the tumbler pin, along with urging members such as springs, are accommodated in the holes formed in the outer and inner cylinders (for example, Japanese Utility Model Application Publication No. H7-37009).

SUMMARY OF THE DISCLOSURE

Problems to be Solved by the Invention

In the technology disclosed in Japanese Utility Model Application Publication No. H7-37009, grooves having a dovetail groove-like cross-sectional shape are engraved along the rows of the driver pin holes that are open in the outer peripheral surface of the outer cylinder, cover plates having an arc shape are inserted into the bottom faces of the grooves, and springs are inserted between the cover plates and the driver pins. The cover plate is provided for each row of the driver pin holes. Meanwhile, there is a demand to reduce the diameter of the outer cylinder of the cylinder lock for space-saving and cost reduction purposes. However, the aforementioned technology presents a limitation in downsizing the outer cylinder, as reducing the diameter of the outer cylinder leads to interference between adjacent dovetail grooves. Therefore, as one approach, a cylindrical cover material may be used for sealing all the driver pin holes simultaneously. However, this approach requires assembling a plurality of driver pins and urging members in a plurality of directions simultaneously, making the assembly difficult, and sacrificing the workability.

The present disclosure has been made in light of the above, and aims to provide a cylinder lock that allows for downsizing the outer cylinder and has good assembly workability.

Means for Solving the Problems

The present disclosure provides a cylinder lock, which includes an outer cylinder, an inner cylinder rotatably engaging with the outer cylinder, and a cover material covering the outer cylinder. The outer and inner cylinders include pinholes communicating with the keyhole, and the driver pins and the tumbler pins can be inserted into the pinholes. The cover material includes a plurality of cover materials that cover a plurality of rows of pinholes along the axial direction of the outer cylinder.

DETAILED DESCRIPTION OF THE DISCLOSURE

First Embodiment

Cylinder Lock

Figure 1:
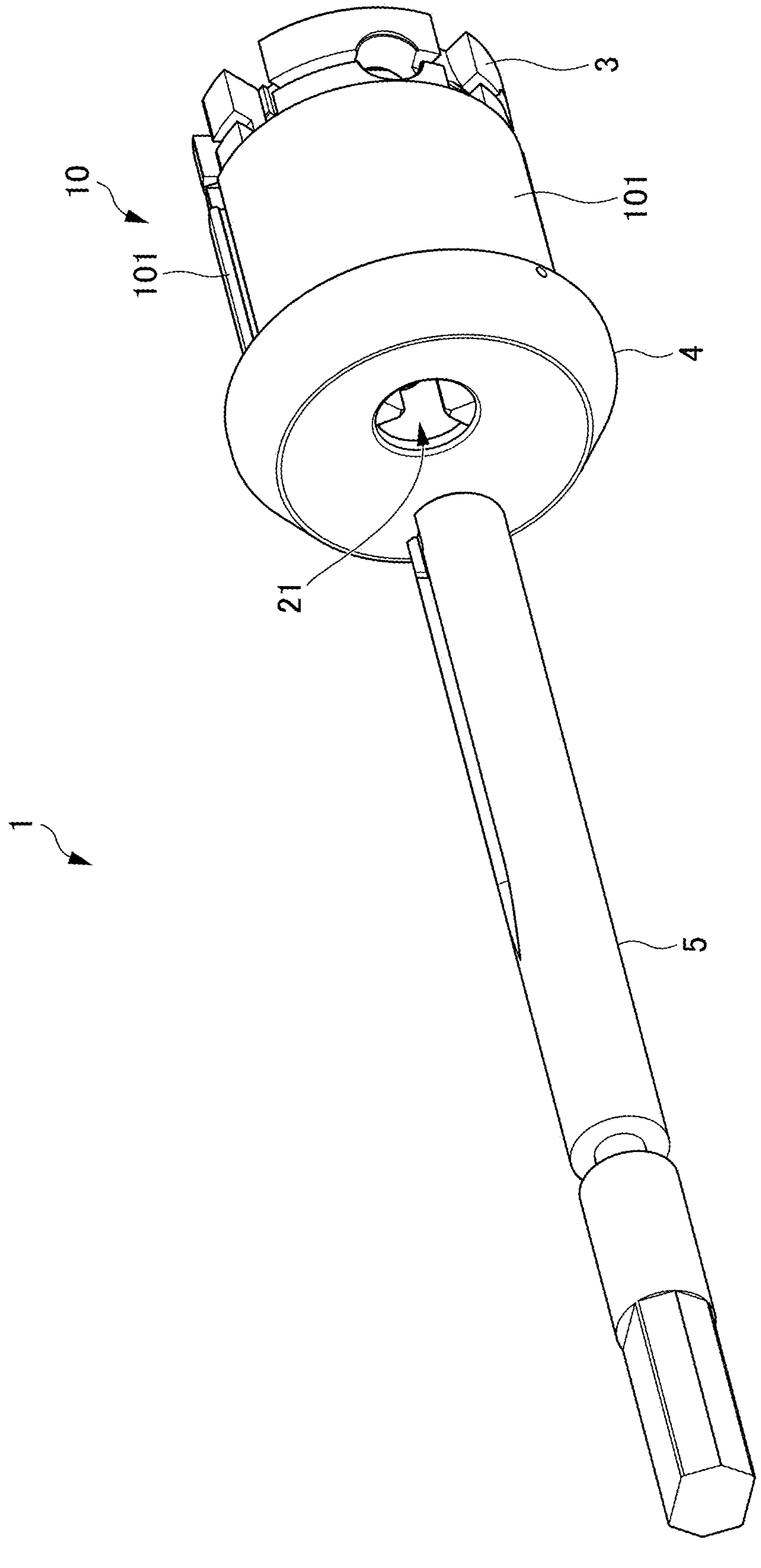
FIG. 1 is a perspective view illustrating a configuration of a cylinder lock according to the first embodiment.
Figure 2:
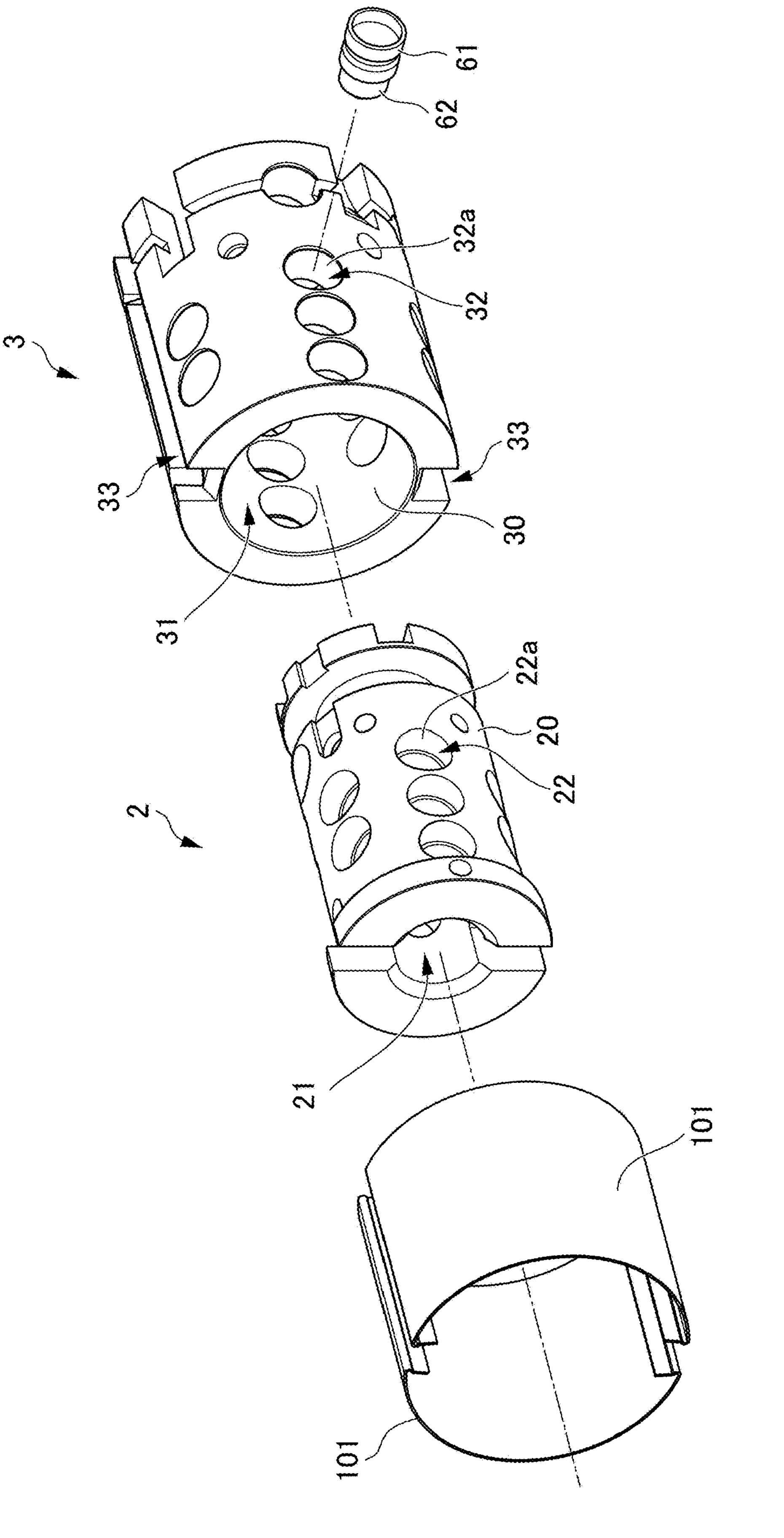
FIG. 2 is an exploded perspective view illustrating the configuration of the cylinder lock according to the first embodiment.

As illustrated in FIG. 1, a cylinder lock 10 according to the present embodiment is used in conjunction with an unlocking key 5 capable of locking and unlocking the cylinder lock 10 in a locking device 1. As illustrated in FIGS. 1 and 2, the cylinder lock 10 includes an inner cylinder 2, an outer cylinder 3, a decorative member 4, a driver pin 61, a tumbler pin 62, and a pair of cover materials 101. The inner cylinder 2 rotatably engages with the fixed outer cylinder 3.

Inner Cylinder

As illustrated in FIG. 2, the inner cylinder 2 is a substantially cylindrical member that rotatably engages with the outer cylinder 3. The material for the inner cylinder 2 is not particularly limited, and may be composed of metal such as brass, for example. An outer peripheral surface 20 being the sliding surface of the inner cylinder 2 contacts an inner peripheral surface 30 of the outer cylinder 3 and engages with the outer cylinder 3. A keyhole 21, into which the unlocking key 5 can be inserted, is formed in the inner cylinder 2 along the axial direction of the inner cylinder 2.

As illustrated in FIG. 2, a plurality of pinholes 22 communicating with the keyhole 21 are formed in the outer peripheral surface 20 of the inner cylinder 2. At least part of the driver pin 61 and the tumbler pin 62 can be inserted into and removed from the plurality of pinholes 22. Each of the pinholes 22 has a cylindrical inner peripheral surface 22*a*. In the present embodiment, a plurality of rows of pinholes 22 are formed along the axial direction of the inner cylinder 2, and a plurality of pairs of pinholes 22 are formed in the circumferential direction of the inner cylinder 2.

Outer Cylinder

As illustrated in FIG. 2, the outer cylinder 3 is a substantially cylindrical member, in which the inner cylinder 2 can engage with holes 31 formed inside the outer cylinder 3. The material for the outer cylinder 3 is not particularly limited, and may be composed of metal such as brass, for example, as in the case of the inner cylinder 2. The outer cylinder 3 is fixed and non-rotatable. The inner peripheral surface 30 being the sliding surface of the outer cylinder 3 contacts the outer peripheral surface 20 of the inner cylinder 2, and engages with the inner cylinder 2.

The holes 31, with which the inner cylinder 2 can engage, are formed in the outer cylinder 3 along the axial direction of the outer cylinder 3. A plurality of pinholes 32 communicating with the holes 31 are formed in the outer peripheral surface of the outer cylinder 3. At least part of the driver pin 61 and the tumbler pin 62 can be inserted into and removed from the plurality of pinholes 32. Each of the plurality of pinholes 32 has a cylindrical inner peripheral surface 32*a*. In the present embodiment, the plurality of rows of pinholes 32 are formed along the axial direction of the outer cylinder 3 and arranged so as to be communicable with the plurality of pinholes 22, and a plurality of pairs of the plurality of rows (six rows in the present embodiment) of pinholes 32 are formed in the circumferential direction of the outer cylinder 3. The plurality of pinholes 22 and the plurality of pinholes 32 are arranged to communicate with each other, such that at least part of the driver pins 61 and the tumbler pins 62 are insertable and removable when the inner cylinder 2 rotates to a predetermined position relative to the outer cylinder 3.

Figure 4:
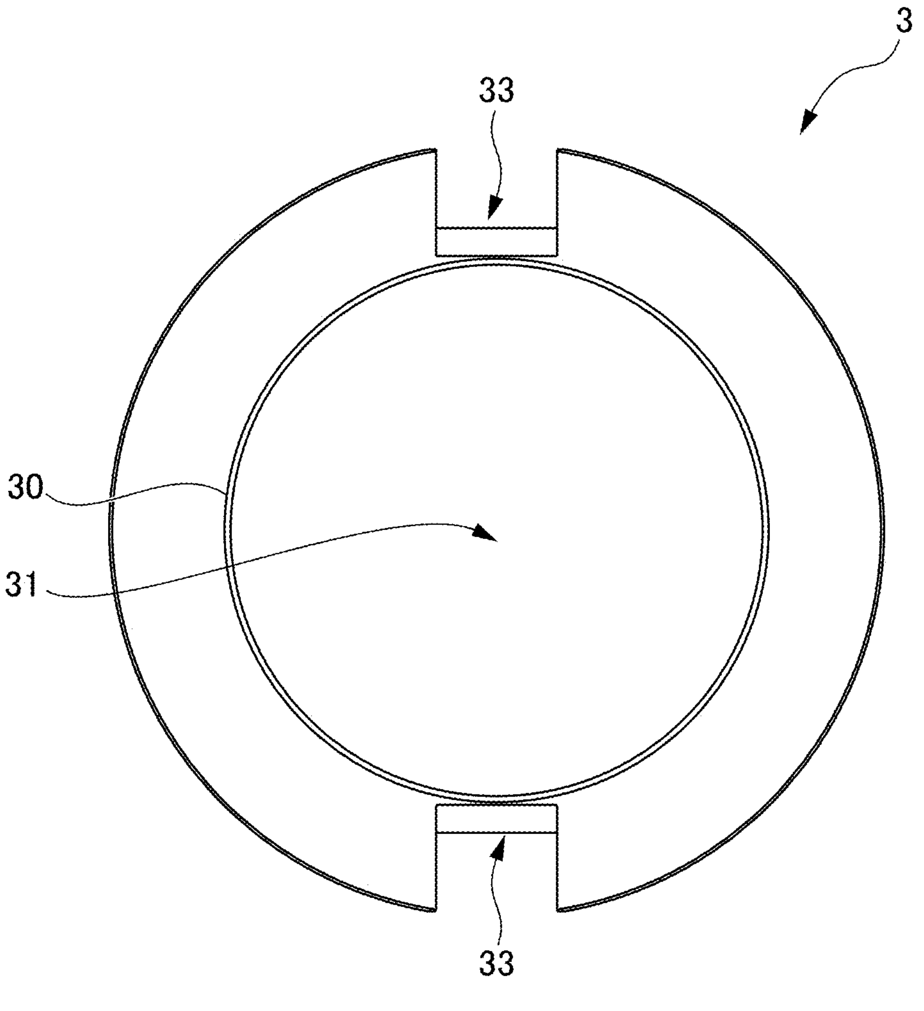
FIG. 4 is a front view of an outer cylinder according to the first embodiment.

FIG. 4 is a view of the outer cylinder 3 from the keyhole 21 side. As illustrated in FIG. 4, the outer cylinder 3 includes a groove 33 along the axial direction. The groove 33 has a substantially rectangular shape in a cross-sectional view and opens towards the outer peripheral surface of the outer cylinder 3. The groove 33 is formed from one end face to the other end face of the outer cylinder 3, and a bent part 8 of the cover material 101 to be described later can engage with the groove 33. In the present embodiment, two grooves 33 are provided. The groove 33 and the bent part 8 will be described later in detail.

Decorative Member

As illustrated in FIG. 1, the decorative member 4 covers and decorates the front face of the cylinder lock 10, which is the face on the keyhole 21 side of the inner cylinder 2 and the outer cylinder 3. The decorative member 4 includes a hole communicating with the keyhole 21. The material for the decorative member 4 is not particularly limited, and may be composed of metal or the like. A plated layer or the like for enhancing the design may be formed on the surface of the decorative member 4. The decorative member 4 makes the inner cylinder 2 and the outer cylinder 3 almost invisible from the outside. Instead of the decorative member 4, at least the front part of the inner cylinder 2 and the outer cylinder 3 may be decorated, for example, with a plated layer.

Driver Pin, Tumbler Pin

The driver pins 61 and the tumbler pins 62 are substantially circular columnar members that are slidably accommodated in the pinholes 22 and 32. The tumbler pin 62 is arranged on the keyhole 21 side, and has a rounded tip that contacts the unlocking key 5. The driver pin 61 has an edge that contacts the tumbler pin 62, and another edge that contacts an urging member (not illustrated). Although FIG. 2 illustrates only one pair of driver pin 61 and one pair of tumbler pin 62 for simplicity, there are a plurality of pairs of driver pins 61 and tumbler pins 62, which are accommodated in the plurality of pairs of pinholes 22 and 32.

In the present embodiment, six rows of driver pins 61 and tumbler pins 62 are arranged in the axial direction of the circular keyhole 21. The rows of the driver pins 61 and tumbler pins 62 arranged in the axial direction of the keyhole 21 are not limited to six rows, and can be any number of rows such as three or more rows, for example.

Cover Material

The cover material 101 covers the plurality of rows of pinholes 32 on the outer cylinder 3 in the axial direction. The cover material 101 contacts the urging member that applies a circumferential urging force to the driver pin 61, and the cover material 101 is fixed in the state of resisting the urging force. As a result, the driver pin 61 is accommodated in the pinhole 32, in the state of being applied with the urging force towards the inner circumferential direction. Since the cover material 101 covers the plurality of rows of pinholes 32 in the axial direction, the space required for arranging the grooves for fixing the cover material is reduced, as compared to the conventional cover materials that cover each row of driver pin holes separately. As a result, the diameter of the outer cylinder 3 can be reduced. Additionally, the plurality of rows of driver pins 61, the tumbler pins 62, and the urging members can be assembled simultaneously, reducing the assembly steps and the component count for the cylinder lock 10.

In the present embodiment, one cover material 101 covers three rows of pinholes 32 in the axial direction. However, this is a non-limiting example, and one cover material may cover a plurality of rows of pinholes in the axial direction. For example, a cover may cover two rows of pinholes 32 in the axial direction. In this case, three cover materials 101 are provided, and three grooves 33 are formed. The more rows of the pinholes covered by one cover material, the greater effects of reducing the space required for groove arrangement and reducing the assembly steps and the component count for the cylinder lock 10. On the other hand, reducing the number of rows of the pinholes covered by one cover material can simplify the assembly of the cylinder lock 10.

The cover material 101 is provided in plural, and two cover materials 101 are provided in the present embodiment. By providing the plurality of cover materials 101, the assembly workability of the cylinder lock 10 can be improved, as compared to the case of using a single cylindrical cover material. In the case of using a single cylindrical cover material, all of the driver pins 61, the tumbler pins 62, and the urging members need to be simultaneously assembled. However, it is difficult to assemble the cylinder lock 10 by attaching a single cover material, in the state of accommodating the plurality of driver pins 61 and tumbler pins 62, which are urged in opposite directions, in the pinholes 22 and 32. Two cover materials 101 are most preferably used, considering the reduction in the space required for grooves and the reduction in the assembly steps and the component count for the cylinder lock 10.

Spring steel is preferably used as the material for the cover material 101. As a result, the cover material 101 can closely adhere to the outer cylinder 3 without any gaps. In particular, stainless spring steel is more preferably used. SUS304CSP is a specific example.

Figure 3:
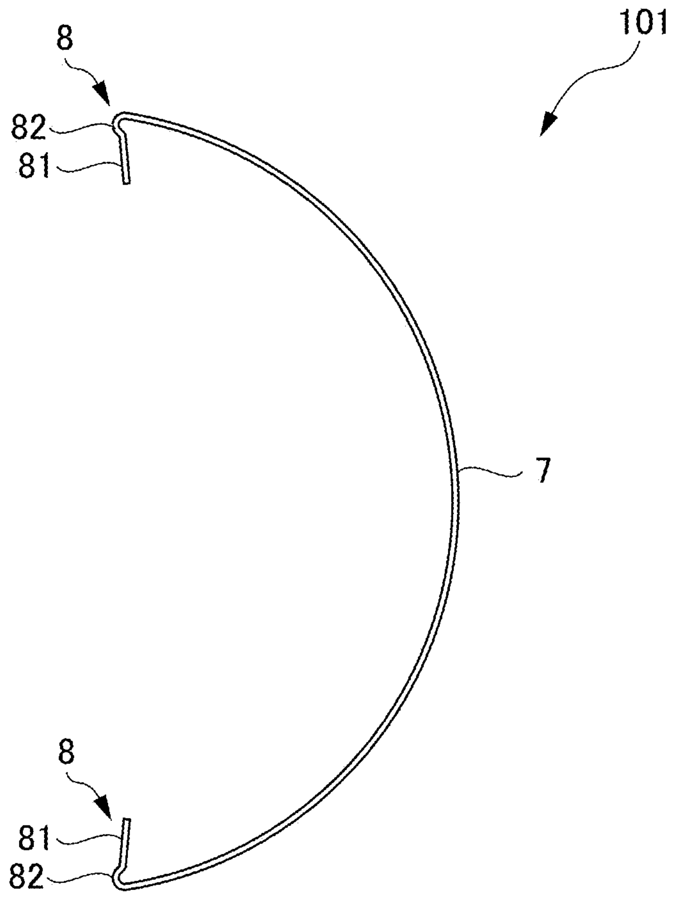
FIG. 3 is a front view of a cover material according to the first embodiment.

As illustrated in FIG. 3, the cover material 101 includes a curved part 7 and a pair of bent parts 8 formed at both ends of the curved part 7. FIG. 3 is a view of the cover material 101 from the keyhole 21 side, from the same perspective as in FIG. 4. In the present embodiment, a pair of cover materials 101 have an identical shape, and are arranged symmetrically about the axial center of the keyhole 21.

The curved part 7 is the surface that contacts the outer peripheral surface of the outer cylinder 3, and has a shape that conforms to the outer peripheral surface of the outer cylinder 3. In the state before attaching the cover material 101 to the outer cylinder 3, the curved part 7 is slightly bent more inward than the outer peripheral surface of the outer cylinder 3. As a result, when the cover material 101 is attached to the outer cylinder 3, the cover material 101 adheres closely to the outer cylinder 3 due to a spring force. Since two cover materials 101 are provided in the present embodiment, the curved part 7 has a substantially semi-circular cross-sectional shape.

The pair of bent parts 8 are formed by bending both ends of the curved part 7. The bent part 8 is configured to be engageable with the groove 33 of the outer cylinder 3, which is illustrated in FIG. 4. As illustrated in FIG. 3, the bent part 8 consists of an extending part 81 and a circular arc-shaped bent part 82. The extending part 81 extends inward from the center of the circular arc shape of the curved part 7. As a result, when the extending part 81 engages with the groove 33, the extending part 81 deforms, and a spring force creates friction between the extending part 81 and the groove 33, thus the cover material 101 can be prevented from displacing in the axial direction. If the displacement of the cover material 101 in the axial direction is desired to be further suppressed, the shape and material of the cover material 101 may be adjusted to increase the spring force.

In the present embodiment, the pair of grooves 33 are provided for the two cover materials 101. In other words, the groove 33 serves as a common groove for engaging the adjacent cover materials 101, and one wall and another wall of the groove 33 can be used for fixing the other cover material 101. Therefore, unlike the case of providing the grooves for each cover material, adjacent grooves will not interfere with each other, and there will be no situations where sufficient installation space cannot be secured.

The method of assembling the cylinder lock 10 involves firstly assembling the inner cylinder 2 and the outer cylinder 3, and then, as illustrated in FIG. 2, fixing the cover material 101 by sliding the bent part 8 into the groove 33 along the axial direction of the outer cylinder 3. As a result, even when the spring force of the cover material 101 is strong, the cylinder lock 10 can be favorably assembled.

Unlocking Key

The unlocking key 5 can lock and unlock the cylinder lock 10. In the present embodiment, the insertion part of the unlocking key 5 into the keyhole 21 has a circular columnar shape. FIG. 1 illustrates the unlocking key 5 as a blank key. When the unlocking key 5 is actually applied to the cylinder lock 10, indentations corresponding to the length and arrangement of the driver pins 61 and the tumbler pins 62 of the cylinder lock 10 are formed on the outer peripheral surface of the insertion part.

Door

Figure 6:
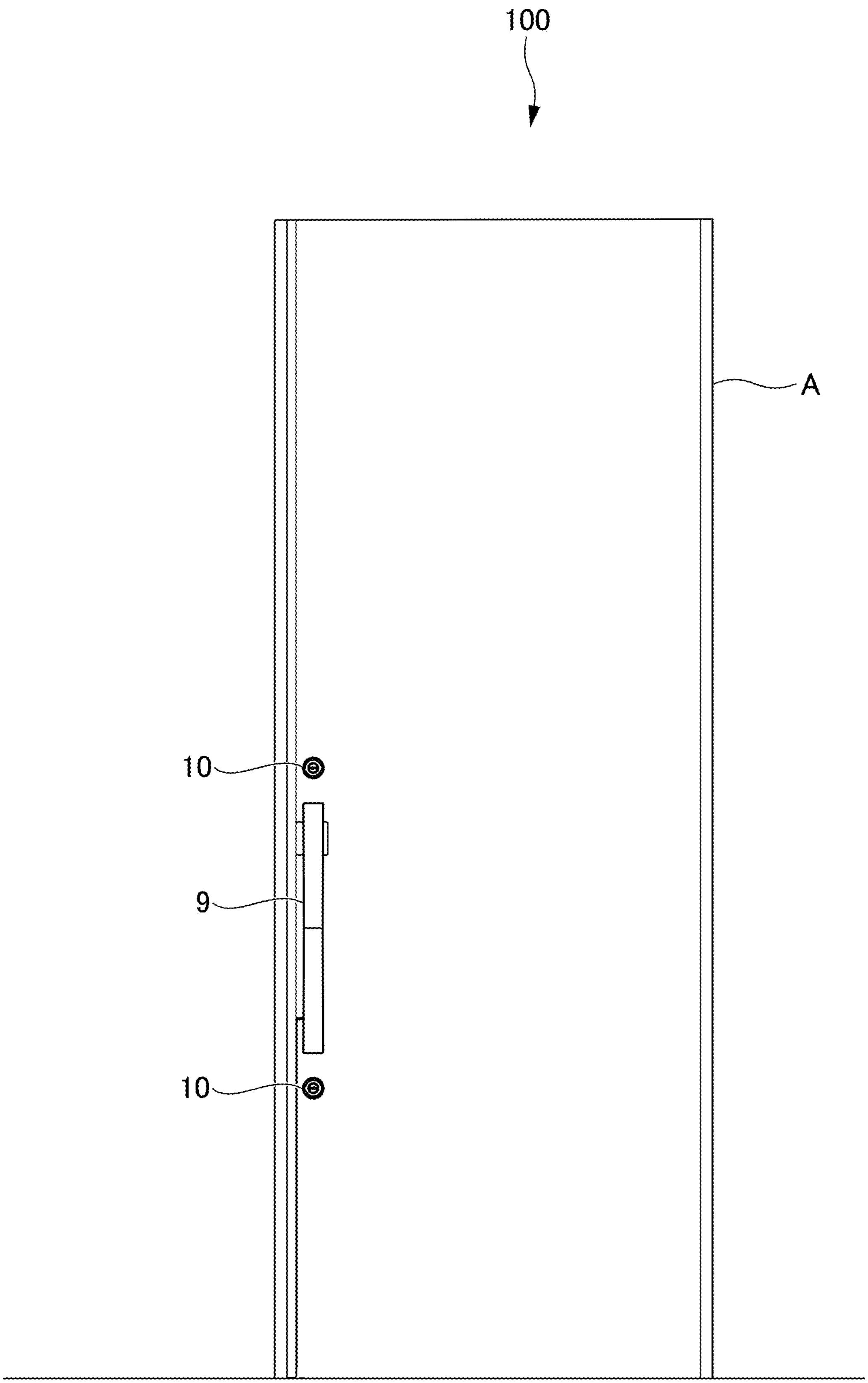
FIG. 6 is a front view of a door equipped with the cylinder lock according to the present embodiment.

As illustrated in FIG. 6, a door 100 according to the present embodiment is installed so as to be openable and closable, in a door opening A of a building structure. On the door front side, the door 100 includes a handle 9 for opening and closing the door 100, and a pair of cylinder locks 10 arranged above and below the handle 9. The door 100 is used, for example, as a front door.

Second Embodiment

Next, the configuration of a cylinder lock 10*a* according to the second embodiment of the present disclosure will be described with reference to FIG. 5. Components similar to those in the first embodiment are marked with the same reference numerals in the drawings, and their descriptions are omitted.

Figure 5:
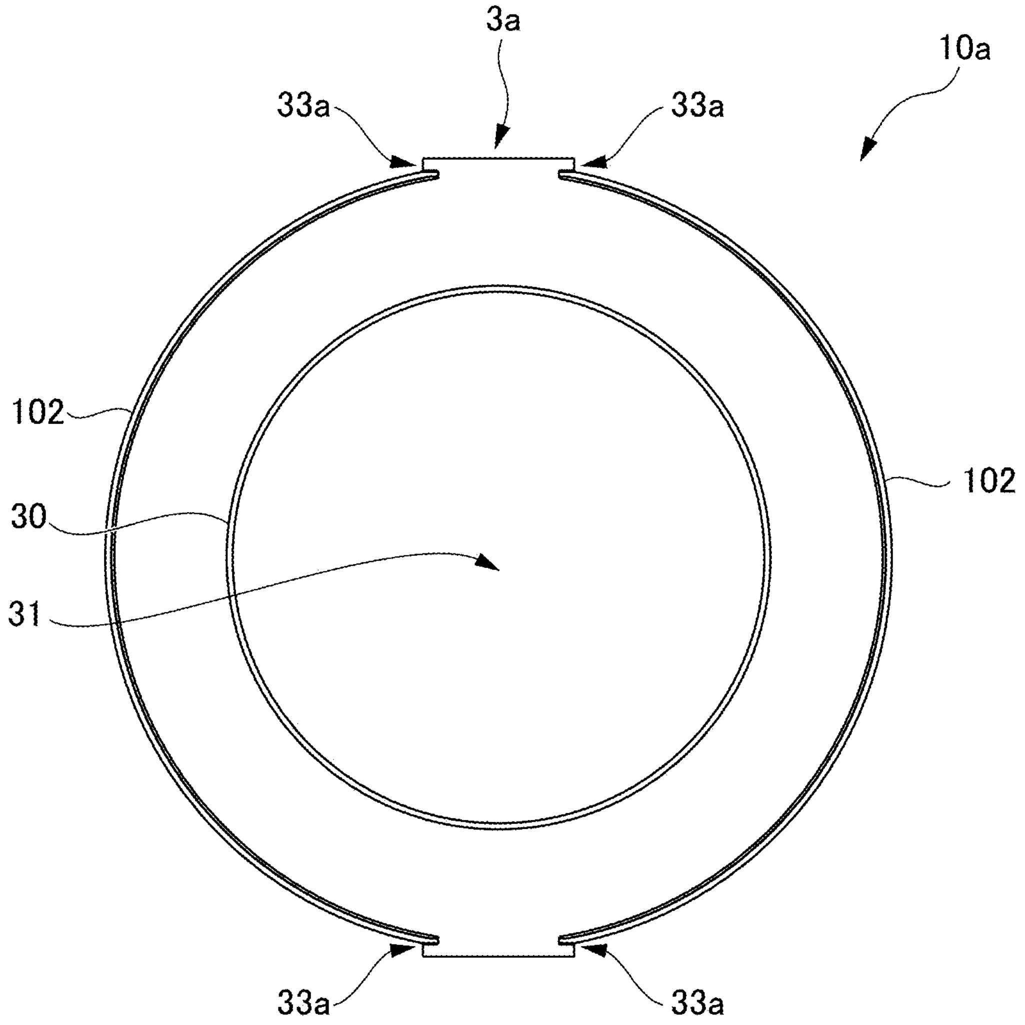
FIG. 5 is a front view of the outer cylinder and the cover material according to the second embodiment.

The cylinder lock 10*a* according to the second embodiment includes an outer cylinder 3*a* and a cover material 102, as illustrated in FIG. 5. Other configurations of the cylinder lock 10*a* are similar to those of the cylinder lock 10 in the first embodiment.

FIG. 5 is a view of the outer cylinder 3*a* and the cover material 102 from the keyhole side, similar to the perspective in FIGS. 3 and 4. The outer cylinder 3*a* includes a plurality of grooves 33*a*, as illustrated in FIG. 5. The plurality of grooves 33*a* are formed on the side surfaces of the extending part formed along the axial direction of the outer cylinder 3*a*. The grooves 33*a* have a substantially rectangular shape in a cross-sectional view, and open towards the tangential direction of the outer cylinder 3*a*. The grooves 33*a* are formed from one edge to the other edge of the outer cylinder 3*a*, and both ends of the cover material 102 can engage with the grooves 33*a*. In the present embodiment, four grooves 33*a* are provided.

The cover material 102 covers the plurality of rows of holes provided in the outer cylinder 3*a* in the axial direction, as in the case of the cover material 101. In the present embodiment, the cover material 102 does not have a bent part and only has a curved part along the outer peripheral surface of the outer cylinder 3*a*. The cover material 102 as such can be composed of stainless spring steel, for example, as in the case of the cover material 101. The structure of the cover material 102 without a bent part can simplify the configuration of the cover material 102. On the other hand, this increases the number of grooves 33*a* of the outer cylinder 3*a*, with which the cover material 102 engages, complicating the configuration of the outer cylinder 3*a*.

The cylinder lock and the door according to the embodiment of the present disclosure have been described above. However, the present disclosure is not limited to the embodiments and can be modified as appropriate.

The invention claimed is:

1. A cylinder lock comprising:
- an outer cylinder;
- an inner cylinder that rotatably engages with the outer cylinder; and
- a cover material that covers the outer cylinder, wherein
- the outer cylinder and the inner cylinder include pinholes, with which a keyhole communicates, and into which a driver pin and a tumbler pin can be inserted,
- the cover material comprises a plurality of cover materials that cover the pinholes formed in the outer cylinder in an axial direction of the outer cylinder,
- the outer cylinder includes a groove formed along the axial direction,
- a plurality of the pinholes are arranged along a circumferential direction of the outer cylinder, and
- the cover material is urged toward a centerline of the keyhole to thereby engage with the groove, and completely covers, in a collective manner, the plurality of the pinholes arranged along the circumferential direction.

2. The cylinder lock of claim 1, wherein the cover material comprises two cover materials.

3. The cylinder lock of claim 1, wherein the cover material is composed of spring steel.

4. The cylinder lock of claim 1, wherein
- the cover material includes a curved part having a shape that conforms to an outer peripheral surface of the outer cylinder, and a bent part that bends inward from the curved part, and
- the cover material is configured such that the bent part can engage with the groove.

5. A door comprising the cylinder lock of claim 1.

6. The cylinder lock according to claim 1, wherein in front view of the outer cylinder, the groove that is engageable with the cover material is formed between one of the pinholes formed along the axial direction and another of the pinholes.

7. The cylinder lock according to claim 1, wherein the pinholes of the outer cylinder are arranged in a plurality of rows along the axial direction.

8. The cylinder lock according to claim 1, wherein the cover material completely covers the pinholes and pins accommodated in the pinholes.

9. An unlocking key for use with the cylinder lock according to claim 1.

* * * * *